US008674991B2

(12) United States Patent
Cao et al.

(10) Patent No.: US 8,674,991 B2
(45) Date of Patent: Mar. 18, 2014

(54) LAYOUT METHOD AND SYSTEM IN A DISPLAY AREA FOR DISCONNECTED DYNAMIC NETWORKS

(75) Inventors: Nan Cao, Beijing (CN); Shixia Liu, Beijing (CN); Li Tan, Beijing (CN); Hong Zhou, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 12/769,707

(22) Filed: Apr. 29, 2010

(65) Prior Publication Data

US 2010/0277480 A1    Nov. 4, 2010

(30) Foreign Application Priority Data

Apr. 30, 2009   (CN) .......................... 2009 1 0136964

(51) Int. Cl.
  *G06T 11/20* (2006.01)

(52) U.S. Cl.
  USPC ........................................................ 345/440

(58) Field of Classification Search
  USPC ........................................................ 345/440
  See application file for complete search history.

(56) References Cited

U.S. PATENT DOCUMENTS

| | | | |
|---|---|---|---|
| 6,369,819 B1 | 4/2002 | Pitkow et al. | |
| 6,583,794 B1 * | 6/2003 | Wattenberg ................... | 715/708 |
| 6,919,910 B2 * | 7/2005 | Chang ........................... | 345/635 |
| 7,346,858 B1 * | 3/2008 | Berg et al. .................... | 715/853 |
| 2008/0046816 A1 * | 2/2008 | Cao et al. ...................... | 715/518 |
| 2008/0222145 A1 * | 9/2008 | Liu et al. ........................... | 707/5 |
| 2008/0288535 A1 * | 11/2008 | Zhang et al. ............... | 707/103 Y |
| 2008/0295037 A1 * | 11/2008 | Cao et al. ........................ | 715/852 |
| 2008/0316229 A1 * | 12/2008 | Terayoko ...................... | 345/660 |
| 2009/0048959 A1 | 2/2009 | Omura et al. | |
| 2010/0063973 A1 * | 3/2010 | Cao et al. ........................ | 707/758 |
| 2010/0321405 A1 * | 12/2010 | MacInnes et al. ............ | 345/635 |

FOREIGN PATENT DOCUMENTS

| | | |
|---|---|---|
| CN | 1791011 A | 6/2006 |
| WO | 2007110952 A1 | 10/2007 |
| WO | WO 2007/138591 | 12/2007 |

OTHER PUBLICATIONS

Brian Johnson, Ben Shneiderman, "Treemaps: a space-filling approach to the visualization of hierarchical information structures", Proc. of the 2nd International IEEE Visualization Conference (San Diego, Oct. 1991) 284-291.*

Terrill L. Frantz & Kathleen M. Carley, "Treemaps as a Tool for Social Network Analysis" CASOS Technical Report, Sep. 2005.*

(Continued)

*Primary Examiner* — Ryan R Yang
*Assistant Examiner* — Jin Ge
(74) *Attorney, Agent, or Firm* — Cantor Colburn LLP

(57) ABSTRACT

A layout method in a display area for multiple graph components in a dynamic network. The multiple graph components are sorted according to their importance into a first subset $S_1$ and a second subset $S_2$ according to the order of their importance. The first subset $S_1$ is divided into an upper subset $C_p$ including only the most important graph component and a lower subset $C_m$. The display area is divided into display portions $S_1'$ and $S_2'$ proportionally according to the importance values of the first subset $S_1$ and the second subset $S_2$. Display portion $S_1'$ is divided into display portions $C_p'$ and $C_m'$ proportionally according to the importance values of the upper subset $C_p$ and the lower subset $C_m$. The first division and the second division and the corresponding division of the display area are executed iteratively until the aspect ratio of display portion $C_p'$ is close to 1.

14 Claims, 6 Drawing Sheets

(56) References Cited

OTHER PUBLICATIONS

Ben Shneiderman, "Tree Visualization with Tree-Maps: 2-d Space-Filling Approach", ACM Transactions on Graphics, vol. 11, No. 1, Jan. 1992, pp. 92-99.*

Mark Bruls, Kees Huizing, and Jarke J. vanWijk, "Squarified Treemaps", in Proceedings of the Joint Eurographics and IEEE TCVG Symposium on Visualization. 1999.*

* cited by examiner $S_1 = \{C_0\}$  $S_2 = \{C_1, C_2, C_3, C_4, C_5, C_6\}$

FIG. 3C ic networks.

LAYOUT METHOD AND SYSTEM IN A DISPLAY AREA FOR DISCONNECTED DYNAMIC NETWORKS

CROSS REFERENCE TO RELATED APPLICATION

This application claims priority under 35 U.S.C. 119 from Chinese Patent Application 200910136964.8, filed Apr. 30, 2009, the entire contents of which are incorporated herein by reference.

BACKGROUND OF THE INVENTION

1. Field of the Invention

The present invention relates to visualization. More particularly, the present invention relates to a layout method and system in a display area for disconnected dynamic networks.

2. Description of Related Art

Network datasets, such as social networks, internet and financial networks etc. are widely available in many fields. As one of the effective techniques to demonstrate relationships in networks, graphs have been studied for a long time and many layout methods and useful interactive tools have been proposed to help users to find out interesting patterns in these network datasets. Recently, more and more attentions are moving into dynamic networks since many networks in real life change over time. Previous methods work well for static networks, but for dynamic networks, they fail to keep temporal coherence and cannot show stable transitions from frame to frame. Therefore, several approaches are designed for visualizing the updates of dynamic networks stably and smoothly by considering both the layout algorithms and the animation techniques.

For disconnected dynamic networks, one of the most popular networks, the visualization methods mentioned above cannot be directly adopted, since new challenges rose in which major challenges are as following. Firstly, it is quite difficult to lay out the disconnected components within the networks on the screen clearly and informatively when they are static, not to mention if they are dynamically changing; secondly, it is also very difficult to keep the changes of the multiple components shown smoothly and stably. If movements between the current location and the previous location are simply minimized, it may cause great overlap when some components are merged together in certain time frame.

There is need for a method and system to address the problems mentioned above.

SUMMARY OF THE INVENTION

According to an aspect of the present invention, a computer implemented layout method for multiple graph components in a display area of a computer system includes: dividing the multiple graph components into a first subset $S_1$ and a second subset $S_2$ according to the order of their importance, wherein the first subset $S_1$ includes at least the most important graph component; dividing the first subset $S_1$ into an upper subset $C_p$ that includes only the most important graph component and a lower subset $C_m$; dividing the display area into display portions $S_1'$ and $S_2'$ proportionally according to importance values of the first subset $S_1$ and the second subset $S_2$; dividing the display portion $S_1'$ into display portions $C_p'$ and $C_m'$ proportionally according to importance values of the upper subset $C_p$ and the lower subset $C_m$; and iteratively executing the steps of dividing until the aspect ratio of display portion $C_p'$ is approximately 1.

According to another aspect of the present invention, a layout system for displaying multiple graph components in a disconnected dynamic network includes: a first division means for performing a first division to divide the multiple graph components into a first subset $S_1$ and a second subset $S_2$ according to the order of their importance, wherein the first subset $S_1$ includes at least the most important graph component; a second division means for performing a second division to divide the first subset $S_1$ into an upper subset $C_p$ which includes only the most important graph component and a lower subset $C_m$ which includes the other graph components; a first display area division means for dividing the display area into display portions $S_1'$ and $S_2'$ proportionally according to the importance values of the first subset $S_1$ and the second subset $S_2$; a second display area division means for dividing the display portion $S_1'$ into display portions $C_p'$ and $C_m'$ proportionally according to the importance values of the upper subset $C_p$ and the lower subset $C_m$; and an executing means for causing execution by (i) the first division means, (ii) the second division means and (iii) the corresponding display division means iteratively until the aspect ratio of display portion $C_p'$ is approximately 1.

By utilizing the method and system according to the present invention, the layout of the disconnected components within the networks on the screen can be clear and informative, at the same time the updates of dynamic networks can be shown stably and smoothly.

BRIEF DESCRIPTIONS OF THE DRAWINGS

The present invention will be better understood from the following description when taken in conjunction with the accompanying drawings. In the accompanying drawings, the same or corresponding technical features or components will be represented by the same or corresponding reference signs. The accompanying drawings together with the following detailed description are included in this specification and form a part of the specification, which are used to describe the principle and advantages of the present invention and preferred embodiments of the present invention by way of example. In the figures:

FIG. 3a-3c shows the results of the division of the display area according to the layout method of the present invention;

FIG. 5b is the triple tree structure corresponding to the division of the display area of FIG. 5a;

FIG. 7 is a computer system structure that the present invention can be applied to.

DETAILED DESCRIPTION OF THE PREFERRED EMBODIMENTS

Figure 1:
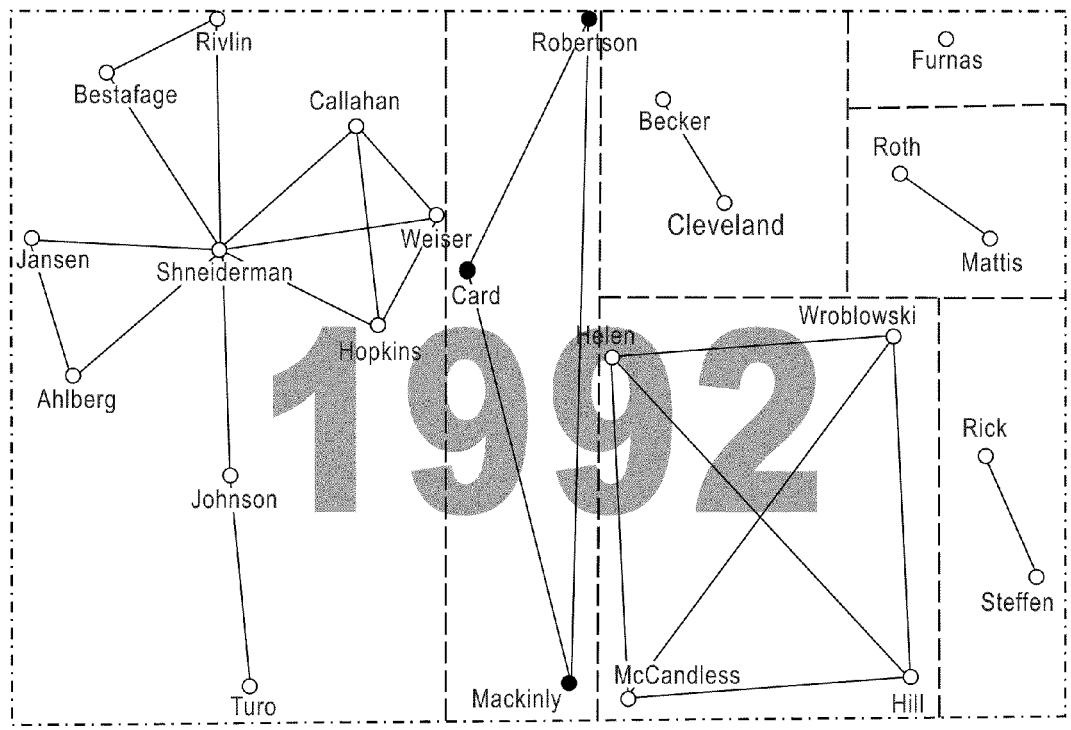
FIG. 1 is an example of disconnected dynamic network illustrated using graphs.

In the following description, numerous particular details are described so that the present invention can be fully understood. However, it is obvious to a person skilled in the art that implementation of the present invention may not have these particular details. In addition, it should be understood that the present invention is not limited to the particular embodiments described herein. Instead, it is contemplated to implement the present invention by using any combination of the following features and elements, regardless of whether they involve different embodiments. Therefore, the following aspects, features, embodiments and advantages are only used for illustration and should not be regarded as the elements or definitions of the attached claims, unless indicated explicitly in the claims.

It should also be noted that, for purpose of clarity, indications and descriptions of components and processes known by a person skilled in the art which are not involved in the present invention are omitted in the drawings and the specification.

Referring now to FIG. 1, an example of disconnected dynamic network using graphs is illustrated. In FIG. 1, dashed line boxes represent graph components of a disconnected dynamic network. It should be noted that the dashed line boxes in FIG. 1 is only for the purpose of illustrating graph components and can be shown or hidden when visualizing the network.

A basic idea of the present invention is to put each of the graph components of a disconnected dynamic network respectively into each of the independent packing cells, while the packing cells are the optimal division of the display area.

According to a basic idea of the present invention, the display area is divided first to form multiple packing cells that are independent with each other. The multiple packing cells are used to display graph components of the disconnected dynamic network respectively. When dividing the display area, at least one of the following requirements should be considered.

1) Graph components with higher importance should occupy larger display area.

2) The aspect ratio of each independent packing cell should be close to 1 as much as possible.

3) Graph components with the highest importance should occupy the center of the display area.

4) The layout should consider the demand that changes of the graph components can be shown stably and smoothly when the disconnected dynamic network evolves with time.

Considering the above requirements, the layout in FIG. 1 is not a good example.

Figure 2:
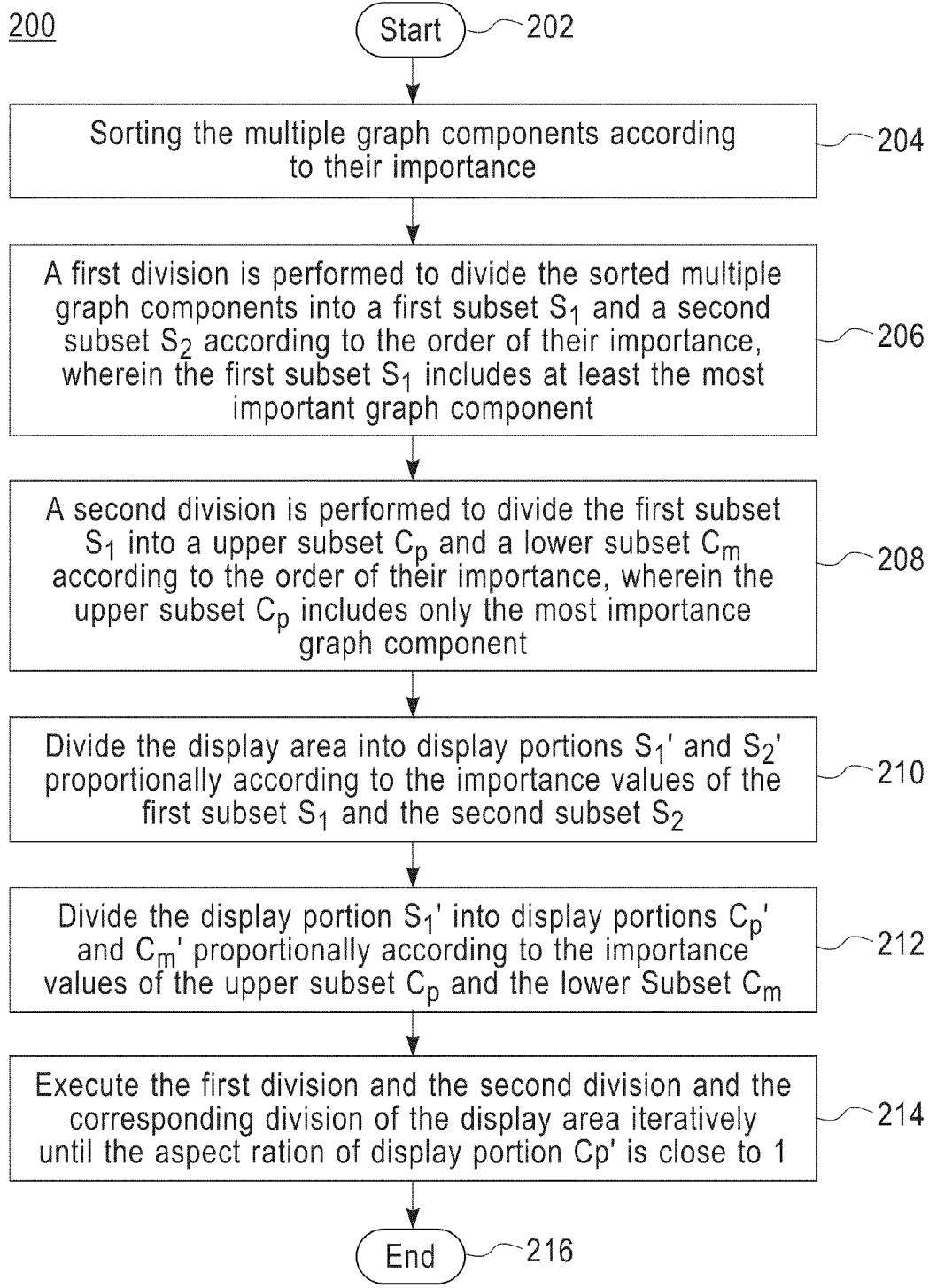
FIG. 2 is an exemplary layout method in a display area for a disconnected dynamic network according to the present invention.

Now referring to FIG. 2, an exemplary layout method in a display area for a disconnected dynamic network according to the present invention is shown. The method 200 of FIG. 2 starts from step 202. In the following step 204, sorting the multiple graph components according to their importance; then in step 206, a first division is performed to divide the sorted multiple graph components into a first subset $S_1$ and a second subset $S_2$ according to the order of their importance, wherein the first subset $S_1$ includes at least the most important graph component; and then in step 208, a second division is performed to divide the first subset $S_1$ into a upper subset $C_p$ and a lower subset $C_m$ according to the order of their importance, wherein the upper subset $C_p$ includes only the most important graph component; in the following step 210, divide the display area into display portions $S_1'$ and $S_2'$ proportionally according to the importance values of the first subset $S_1$ and the second subset $S_2$; then in step 212, divide the display portion $S_1'$ into display portions $C_p'$ and $C_m'$ proportionally according to the importance values of the upper subset $C_p$ and the lower subset $C_m$; then in step 214, execute the first division and the second division and the corresponding division of the display area iteratively until the aspect ratio of display portion $C_p'$ is close to 1. It is anticipated to those skilled art that the division of the display area could be performed after the division of the graph components into subsets is done.

For the purpose of description, the method above is described by using datasets. Suppose the disconnected dynamic network includes multiple graph components $c_0$, $c_1$, ..., $c_n$, in the specification, it will be described as dataset $C=\{c_0, c_1, \ldots c_n\}$, in which n is an integer. The graph components of the disconnected dynamic network may be sorted according to their importance in a descending order thus the sorted graph components set is obtained, here referenced as $C=\{c_i|i\epsilon[0,n]\}$, in which n is an integer, and the importance order of the multiple graph components is $c_0>c_1>\ldots>c_n$. Then, a first division is performed to divide the sorted multiple graph components $C=\{c_i|i\epsilon[0,n]\}$ into a first subset $S_1=\{c_i|i\epsilon[0,k]\}$ and a second subset $S_2=\{c_i|i\epsilon[k+1,n]\}$ according to the importance order, in which n>k≥0 and k is an integer. Then, a second division is performed to divide the first subset $S_1=\{c_i|i\epsilon[0,k]\}$ into an upper subset $C_p=\{c_0\}$ and a lower subset $C_m=\{S_1-C_p\}$ according to the order of their importance.

The display area is then divided into display portions $S_1'$ and $S_2'$ proportionally according to the importance values of the first subset $S_1$ and the second subset $S_2$ as well as the display portion $S_1'$ into display portions $C_p'$ and $C_m'$ proportionally according to the importance values of the upper subset $C_p$ and the lower subset $C_m$. Executing the first division, second division and corresponding division of the display area iteratively, till the aspect ration of display portion $C_p'$ is close to 1.

Preferably, n/2>k≥0 is used for the iterative execution of the division thus half of the computation is saved. The division mentioned herein is to divide the display area according to the importance of the corresponding graph components of the disconnected dynamic network. First, the most important graph component is divided and the aspect ratio of the display portion for the most important graph component is computed each time the division is executed, then the division in which the aspect ratio of the display portion for the most important graph component is close to 1 is chosen as the final division of the display area.

By way of iterative execution using importance as a parameter, the requirements 1) Graph components with higher importance should occupy larger display area; and 2) The aspect ratio of each independent packing cell should be close to 1 as much as possible can be satisfied. With considering the importance of the graph components of the disconnected dynamic network, the focus of the layout as well as the structure of the disconnected dynamic network can be shown more clearly compared with prior arts.

In the following the results of the division of the display area is described with FIG. 3. Here it is supposed that there are six graph components in the disconnected dynamic network, graph components set $C=\{c_i|i\epsilon[0,n]\}$ is used to represent the graph components of the network after sorting in a descending order, in which i=6, the order of importance for each graph components is $c_0>c_1>,\ldots,>c_6$. Weight set $W=\{w_i|i\epsilon[0,n]\}$ is used to represent the importance of each graph components in which i=6.

According to the embodiment mentioned above, a first division is performed to graph components set $C=\{c_i|i\epsilon[0,n]\}$. The graph components set $C=\{c_i|i\epsilon[0,n]\}$ is divided into subset $S_1=\{c_i|i\epsilon[0,k]\}$ and subset $S_2=\{c_i|i\epsilon[k+1,n]\}$, in which n>k≥0 and k is an integer. When k=0, $S_1=\{c_0\}$, $S_2=\{c_1, c_2, c_3, c_4, c_5, c_6\}$. The display area is divided according to the importance values of the subsets $S_1$ and $S_2$ proportionally, thus display portions $S_1'$ and $S_2'$ are formed. As the weights of the subsets $S_1$ and $S_2$ are $W_1=\{w_0\}$ and $W_2=\{w_1, w_2, w_3, w_4, w_5,$ $w_6$}, the display portions $S_1'$ and $S_2'$ are divided according to the importance values of the subsets $S_1$ and $S_2$, i.e. $S_1'=W_1/(W_1+W_2)$ and $S_2'=W_2/(W_1+W_2)$, as shown in FIG. 3a.

In FIG. 3a the display area is divided vertically into display portions $S_1'$ and $S_2'$. This is just an exemplary division. Those skilled in the art will understand that the display area could be divided horizontally into display portions $S_1'$ and $S_2'$. Then, a second division of subset $S_1$ is performed to form subsets $C_p=\{c_0\}$ and $C_m=\{S_1-C_p\}$. When k=0, $C_p=\{c_0\}$ and $C_m=\{\emptyset\}$. Because $C_m=\{\emptyset\}$, the display portion $S_1'$ remains unchanged, i.e., the results remains the same as shown in FIG. 3a. Then iteratively executing the method mentioned above with n/2>k≥0. When k=1, $S_1=\{c_0, c_1\}$ and $S_2=\{c_2, c_3, c_4, c_5, c_6\}$.

The display area is divided according to the importance values of the subsets $S_1$ and $S_2$ proportionally, thus display portions $S_1'$ and $S_2'$ are formed. As the weights of the subsets $S_1$ and $S_2$ are $W_1=\{w_0, w_1\}$ and $W_2=\{w_2, w_3, w_4, w_5, w_6\}$, the display portions $S_1'$ and $S_2'$ are divided according to the importance values of the subsets $S_1$ and $S_2$, i.e. $S_1'=W_1/(W_1+W_2)$ and $S_2'=W_2/(W_1+W_2)$, as shown in FIG. 3b. Then, a second division of subset $S_1$ is performed to form subsets $C_p=\{c_0\}$ and $C_m=\{S_1-C_p\}$. When k=1, $C_p=\{c_0\}$ and $C_m=\{c_1\}$. The display portion $S_1'$ is divided according to the importance values of the subsets $C_p$ and $C_m$ proportionally, thus display portions $C_p'$ and $C_m'$ are formed.

As the weights of the subsets $C_p$ and $C_m$ are $W_p=\{w_0\}$ and $W_m=\{w_1\}$, the display portions $C_p'$ and $C_m'$ are divided according to the importance values of the subsets $C_p$ and $C_m$, i.e. $C_p'=W_p/(W_p+W_m)$ and $C_m'=W_m/(W_p+W_m)$, as shown in FIG. 3b. As shown in FIG. 3b, the aspect ratio of display portion $C_p'$ is $R_p=W_p/W_1$. The $R_p$ for other values of k can be calculated accordingly. After the iterative execution of the method with n/2>k≥0 (with k=0, 1, 2, 3 for the example herein), the division that the aspect ratio $R_p$ of $C_p'$ is close to 1 is chosen as the best layout for the disconnected dynamic network. Here the value of k that makes the division that the aspect ratio $R_p$ of $C_p'$ is close to 1 is chosen as the parameter for the layout of the disconnected dynamic network, referred as q1. For example, if k=2, the aspect ratio $R_p$ of $C_p'$ is $R_p=W_p/W_1=0.99$, which is close to 1, then k=2 is chosen as the parameter for the layout of the disconnected dynamic network, i.e. q1=2, as shown in FIG. 3c.

According to another embodiment of the present invention, a third division is performed. Subset $S_2=\{c_i|i\in[k+1,n]\}$ is divided according to the importance order to form subsets $C_l$ and $C_r$, the display area is further divided according to the importance values of subsets $C_l$ and $C_r$ proportionally, thus display portions $C_p'$ and $C_m'$ are formed. First, a third division is performed that $S_2=\{c_i|i\in[k+1,n]\}$ is divided into subsets $C_l=\{c_i|i\in[q1+1,j]\}$ and $C_r=\{c_i|i\in[j+1,n]\}$, iteratively from j=q1+1 to j=n−1, find the value of j that makes $C_l$ and $C_r$ has the most similar aspect ratio, i.e., the displays area that $C_l'$ and $C_r'$ occupy are close, the value of j is recorded as q2. Then, the layout of the display portions $C_p'$, $C_m'$, $C_l'$ and $C_r'$ corresponding to $C_p$, $C_m$, $C_l$ and $C_r$ is shown in FIG. 4, here the requirement that the graph components with the highest importance should occupy the center of the display area is satisfied, and $C_l'$ and $C_r'$ are on each side vertically.

Here, suppose there are six graph components in the disconnected dynamic network. Subsets $C_p$, $C_m$, $C_l$ and $C_r$ compose a triple tree structure T, in which the root node $C_p$ of the tree has three sub-trees: center sub-tree $C_m$, left sub-tree $C_l$ and right sub-tree $C_r$, each of which corresponds to respective display portions. Then, a fourth division is performed to divide the left sub-tree $C_l$ and right sub-tree $C_r$, in which the division is performed according to the rules in the following with q2' represents the value of j that the division of $C_l$ and $C_r$ makes them have the most similar aspect ratios.

If the width is greater than the height of the display portions $C_m'$, $C_l'$ or $C_r'$, then perform the first division, the second division and the third division iteratively for the lower subset $C_m$, the left subset $C_l$ or the right subset $C_r$, until there is only one graph component left in each subset. If the width is less than the height of the display portions $C_m'$, $C_l'$ or $C_r'$, rotate the display portions $C_m'$, $C_l'$ or $C_r'$ for 90 degree and then perform the first division, the second division and the third division iteratively for the lower subset $C_m$, the left subset $C_l$ or the right subset $C_r$, until there is only one graph component left in each subset.

Figure 4:
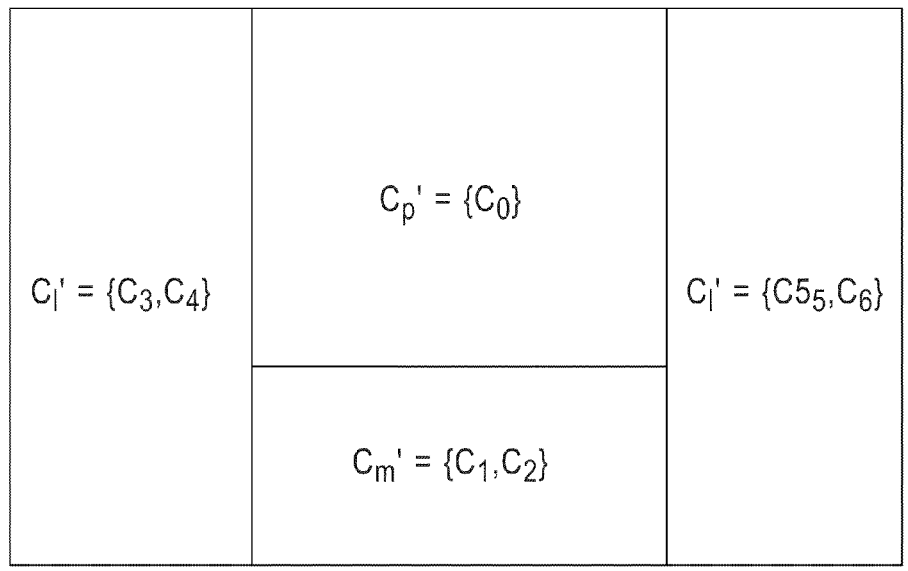
FIG. 4 shows the results of the division of the display area according to an embodiment of the present invention.

Now in connection with FIG. 4, if the width is greater than the height of the display portion $C_l'$, then perform the first division, the second division and the third division iteratively for the left subset $C_l$, and if the width is less than the height of the display $C_l'$, rotate the display portion $C_l'$ for 90 degree and then perform the first division, the second division and the third division iteratively for the left subset $C_l$. if the width is greater than the height of the display portion $C_r'$, then perform the first division, the second division and the third division iteratively for the right subset $C_r$, and if the width is less than the height of the display $C_r'$, rotate the display portion $C_r'$ for 90 degree and then perform the first division, the second division and the third division iteratively for the right subset $C_r$.

More specifically:

A) for the left sub-tree $C_l$:

1) if the width is greater than the height of the display portion $C_l'$ that corresponds to the left sub-tree $C_l$, divide $C_l$ into $C_l=\{c_i|i\in[q1+1,n]\}$ and $C_r=\{\emptyset\}$, i.e., q2'=n, and then the second division is performed as it is the left sub-tree;

2) if the width is less than the height of the display portion $C_l'$ that corresponds to the left sub-tree $C_l$, divide $C_l$ into $C_l=\{\emptyset\}$ and $C_r=\{c_i|i\in[q1+1,n]\}$, i.e., q2'=q1, and then the second division is performed as it is the right sub-tree; and B) for the right sub-tree $C_r$:

1) if the width is greater than the height of the display portion $C_r'$ that corresponds to the right sub-tree $C_r$, divide $C_r$ into $C_l=\{\emptyset\}$ and $C_r=\{c_i|i\in[q1+1,n]\}$, i.e., q2'=q1, and then the third division is performed as it is the right sub-tree;

2) if the width is less than the height of the display portion $C_r'$ that corresponds to the right sub-tree $C_r$, divide $C_r$ into $C_l=\{c_i|i\in[q1+1,n]\}$ and $C_r=\{\emptyset\}$, i.e., q2'=n, and then the third division is performed as it is the left sub-tree.

Figure 5A:
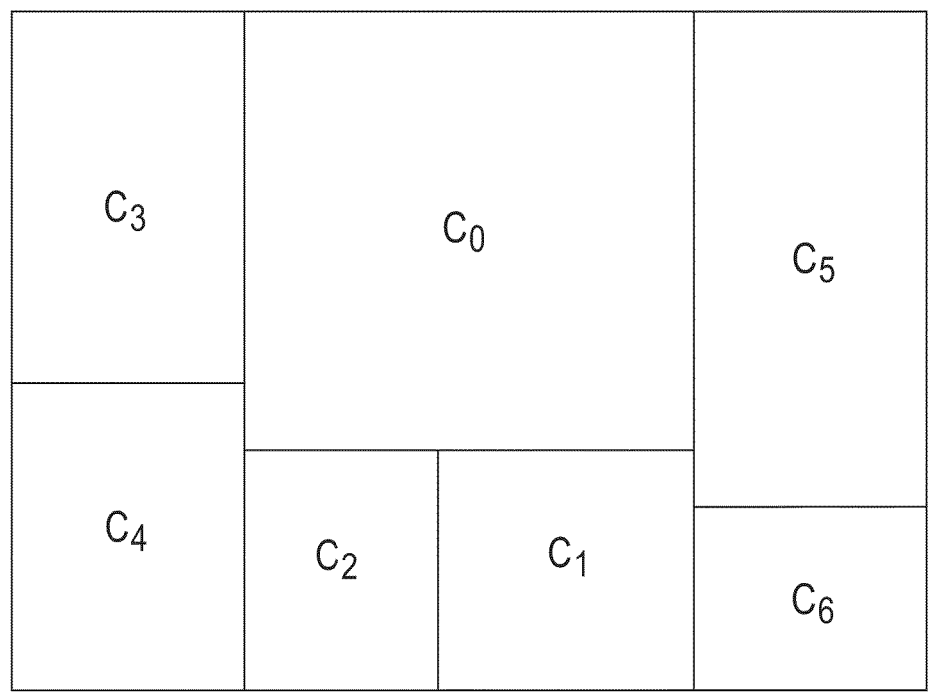
FIG. 5a shows the results of the division of the display area according to an embodiment of the present invention.

Create root node t that corresponds to the triple tree T, in which q1 and q2 are recorded. Correlate t with dataset C. Create corresponding empty sub-tree nodes $t_l$, $t_m$ and $t_r$ and correlate them with $C_l$, $C_m$ and $C_r$. Iteratively perform the divisions based on the criteria mentioned above to the center sub-tree $C_m$, the left sub-tree $C_l$ and the right sub-tree $C_r$ if they are not empty and perform corresponding divisions of the display area, until all graph components has been placed in the right place, i.e. the layout has been completed. Still using the disconnected network with six graph components as an example, the layout will look like what is shown in FIG. 5a after using the method of the present invention with the triple tree structure shown in FIG. 5b.

The division of the display portions to form display portions $C_l'$ and $C_r'$ according to the weight of the subsets $C_l$ and $C_r$ is similar to the division of the display area to form display portions $S_1'$ and $S_2'$ according to the weight of subsets $S_1$ and $S_2$ as well as the division of the display portions to form display portions $C_p'$ and $C_m'$ according to the weight of the subsets $C_p$ and $C_m$, i.e. dividing using the weight of the graph components, thus no further detailed description is presented here.

After implementing the method of the present invention mentioned above, the display portion $C_p'$ is in the center of the display area, $C_m'$ beneath $C_p'$, $C_l'$ and $C_r'$ to the left side and right side of $C_p'$.

Figure 6:
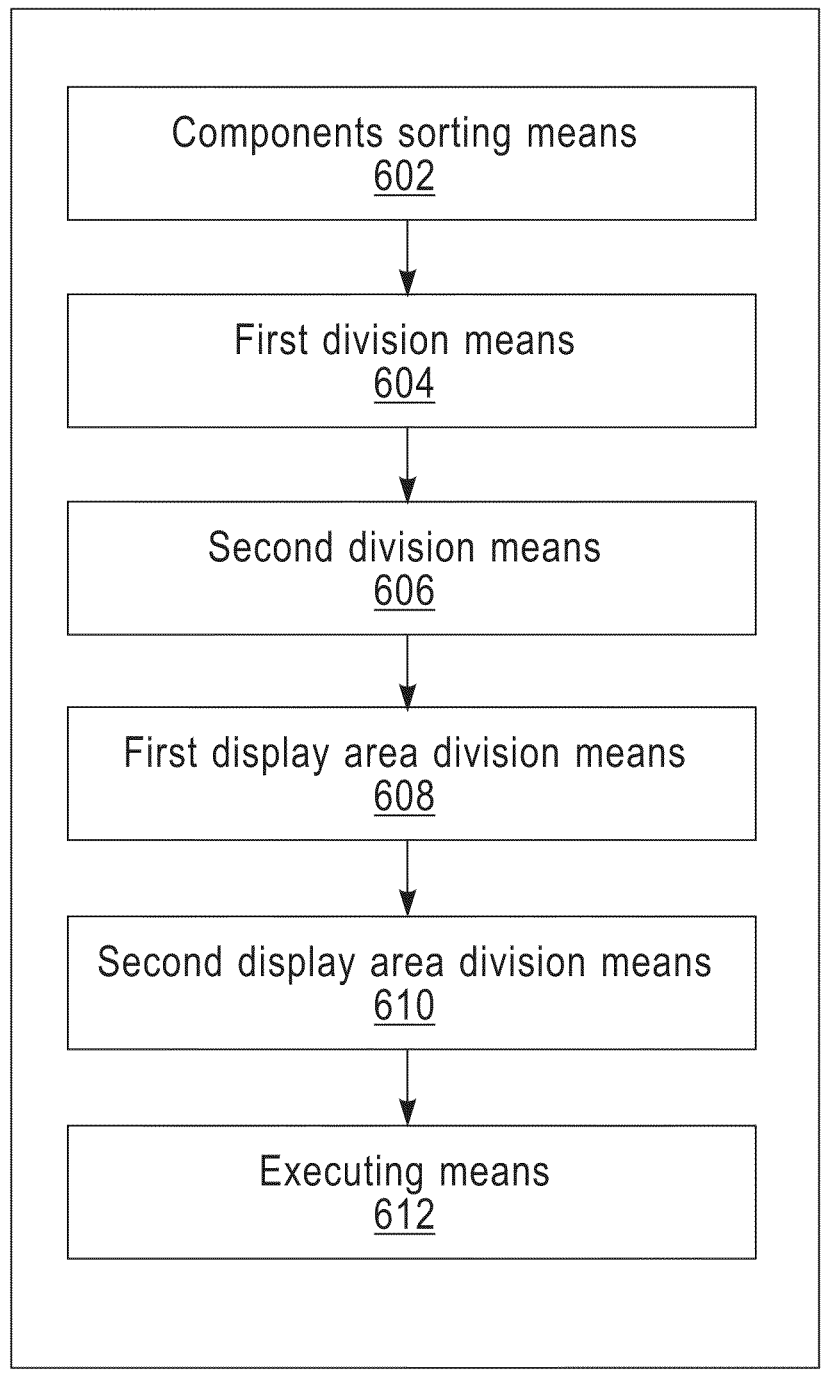
FIG. 6 is an exemplary layout system in a display area for a disconnected dynamic network according to the present invention.

Now referring to FIG. 6, in which an exemplary layout system 600 in a display area for a disconnected dynamic network according to the present invention is shown. The system 600 includes a components sorting means 602 for sorting the multiple graph components according to their importance; a first division means 604 for performing a first division to divide the sorted multiple graph components into a first subset $S_1$ and a second subset $S_2$ according to the order of their importance, wherein the first subset $S_1$ includes at least the most important graph component; a second division means 606 for performing a second division to divide the first subset $S_1$ into a upper subset $C_p$ and a lower subset $C_m$ according to the order of their importance, wherein the upper subset $C_p$ includes only the most important graph component; a first display area division means 608 for dividing the display area into display portions $S_1'$ and $S_2'$ proportionally according to the importance values of the first subset $S_1$ and the second subset $S_2$; a second display area division means 610 for dividing the display portion $S_1'$ into display portions $C_p'$ and $C_m'$ proportionally according to the importance values of the upper subset $C_p$ and the lower subset $C_m$; and executing means 612 for executing the first division and the second division and the corresponding division of the display area iteratively until the aspect ratio of display portion $C_p'$ is close to 1.

In the following, the update method of the disconnected dynamic network according to the present invention is described. As mentioned before, subsets $C_p$, $C_m$, $C_l$ and $C_r$ formed a triple tree structure T, in which root node $C_p$ has three sub-trees: the center sub-tree $C_m$, the left sub-tree $C_l$ and the right sub-tree $C_r$. Such triple tree saves the latest iterative layout information. If a graph component $c_i$ is deleted, then locate the corresponding node $t_i$ in the triple tree structure T and delete the node $t_i$, and then locate the parent node of $c_i$, make q1 and q2 of the found tree node minus 1. If a graph component $c_i$ is added, then locate the parent node of $c_i$ according to the location $c_i$ is going to be added and make q1 and q2 of the found tree node add 1. If a graph component $c_i$ is moved, then 1) delete $c_i$ at the original location; 2) adding $c_i$ at the new location.

By using the updated q1 and q2, as well as the updated triple tree structure T, the layout method can be utilized again by dividing the new dataset C' to new subsets $C_p$, $C_l$, $C_m$ and $C_r$, and dividing the display area according to the new subsets $C_p$, $C_l$, $C_m$ and $C_r$.

Figure 5B:
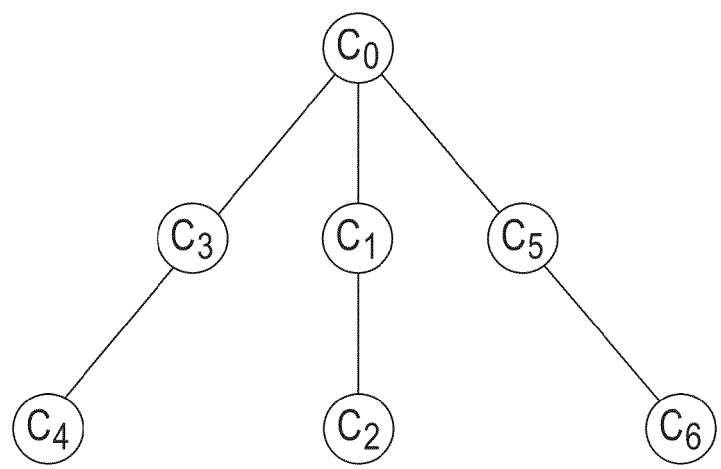

Again, take the disconnected dynamic network includes six graph components as an example, suppose the layout of the last iterative is shown in FIG. 5, the corresponding triple tree structure T is shown in FIG. 5b.

For the triple tree structure with the root node $c_0$, q1=2, q2=4; for the triple tree structure with the root node $c_3$, q2=3, q1 doesn't exist (because $C_m$ and $C_l$ of $C_3$ is empty); for the triple tree structure with the root node $c_1$, q2=1, q1 doesn't exist (because $C_m$ and $C_r$ of $C_1$ is empty); for the triple tree structure with the root node $c_5$, q2=5, q1 doesn't exist (because $C_m$ and $C_r$ of $C_5$ is empty).

If graph component $c_3$ is deleted, according to the update method mentioned above, first locate the corresponding node $t_3$ in the triple tree structure and delete it (corresponding to $c_3$), then locate the father node of $t_3$, (here is node $c_0$). Then make q1 and q2 of the found tree node minus 1, i.e., for the triple tree structure with root node $c_0$, q1=1, q2=3. And then divide the new dataset using updated q1 and q2. As for the example, for the dataset C'={$c_0$, $c_1$, $c_2$, $c_4$, $c_5$, $c_6$}, use q1=1, q2=3 (here q2=3 corresponds to $c_4$) to divide the dataset as well as the corresponding display area. Thus, after the division, $C_p$={$c_0$}, $C_m$={$c_1$}, $C_l$={$c_2$, $c_4$} and $C_r$={$c_5$, $c_6$}.

The basic principle of the present invention is described in conjunction with the embodiments above. However, for those skilled in the art, it should be understood that, each or any step or component of the method and the apparatus of the present invention may be implemented with hardware, firmware, software or a combination thereof in any computing apparatus (including processors, storage medium and the like) or a network of computing apparatuses, which can be done by those skilled in the art with basic programming skills after reading the specification of the present invention.

Therefore, the object of the present invention may also be implemented by executing a program or a series of programs on any computing apparatus. The computing apparatus can be a known general-purpose apparatus. Therefore, the object of the present invention can be implemented through program products providing program codes that implement the method or the apparatus. That is, such a program product also constitutes the present invention, and storage medium stored with such a program product also constitute the present invention. Apparently, the storage medium can be any known storage medium or any storage medium to be developed in the future.

Figure 7:
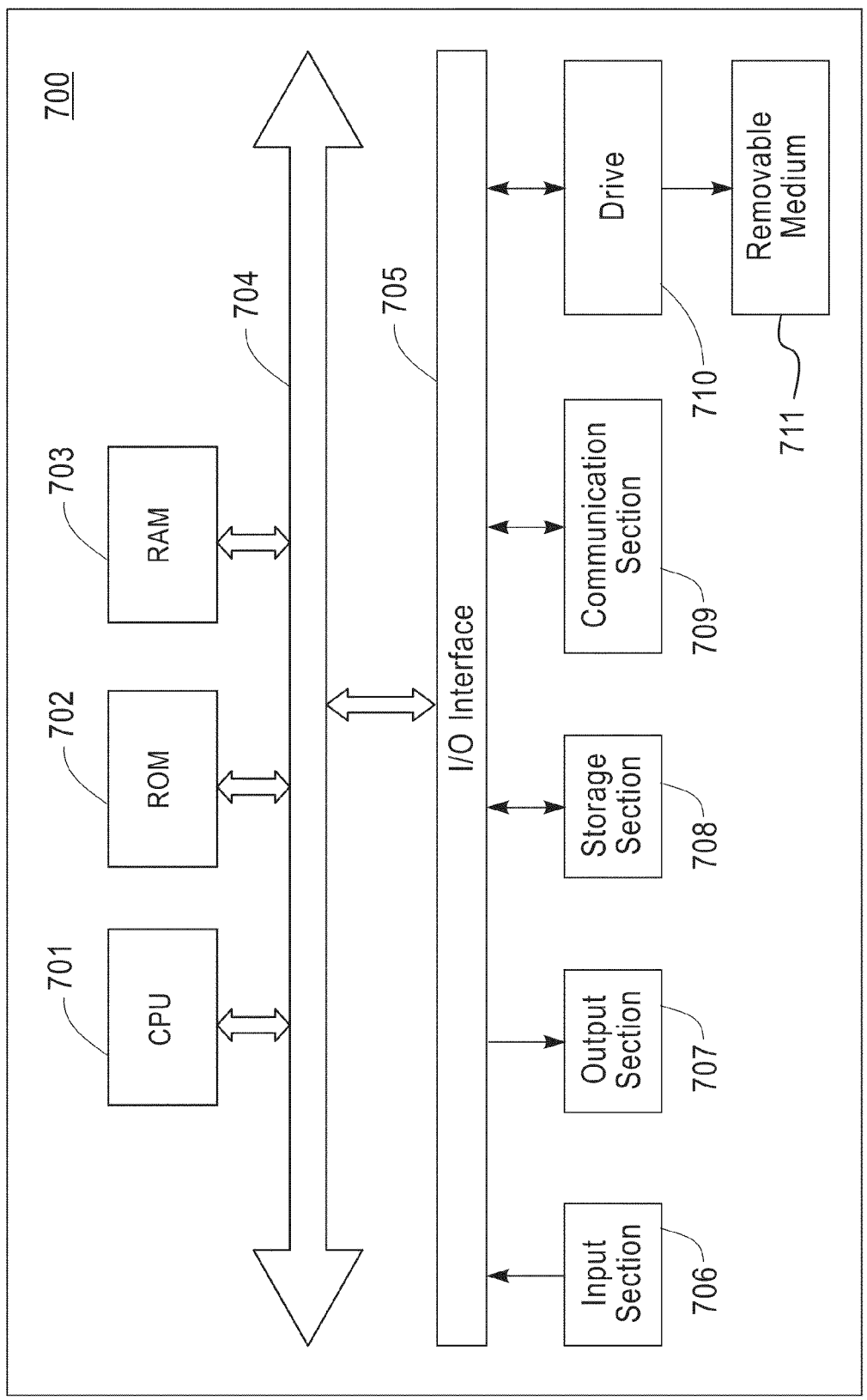

In case of implementing the embodiments of the present invention by software and/or firmware, a program constituting the software may be installed into a computer with dedicated hardware, for example, a general-purpose personal computer 700 as shown in FIG. 7 from a storage medium or a network, and the computer is capable of performing various functions if with various programs installed therein.

In FIG. 7, a Central Processing Unit (CPU) 701 performs various processing based on a program stored in a Read Only Memory (ROM) 702 or a program loaded from a storage section 708 to a Random Access Memory (RAM) 703. In the RAM 703, required data when the CPU 701 performs the various processing or the like is also stored as necessary. The CPU 701, the ROM 702, and the RAM 703 are connected to one another via a bus 704. An input/output interface 705 is also connected to the bus 704.

The following components are connected to the input/output interface 705: an input section 706 including a keyboard, a mouse, or the like; an output section 707 including a display such as a Cathode Ray Tube (CRT), a Liquid Crystal Display (LCD), or the like, and a loudspeaker or the like; the storage section 708 including a hard disk or the like; and a communication section 709 including a network interface card such as a LAN card, a modem, or the like. The communication section 709 performs communication processing via the network such as the Internet.

A drive 710 is also connected to the input/output interface 705 as necessary. A removable medium 711, such as a magnetic disk, an optical disk, a magneto-optical disk, a semiconductor memory, or the like, is installed on the drive 710 as necessary, so that a computer program read therefrom may be installed into the storage section 708 as necessary.

In the case where the above-described series of processing is implemented with software, the program that constitutes the software may be installed from a network such as the Internet or a storage medium such as the removable medium 711.

Those skilled in the art would appreciate that, the storage medium is not limited to the removable medium 711 having the program stored therein as illustrated in FIG. 7, which is distributed separately from the device for providing the program to the user. Examples of the removable medium 711 include a magnetic hard or floppy disk, an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 702, the hard disk contained in the storage section 708, or the like, which has the program stored therein and is distributed to the user together with the device that contains them.

It should also be noted that, in the apparatus and method of the present invention, apparently the components or the steps may be decomposed and/or recombined. The decomposition and/or recombination should be considered as equivalent solutions of the present invention. Moreover, the steps performing the above described series of processing can, but not necessarily, be performed chronologically in the natural order of the description. Some steps may be performed in parallel or independently of one another.

The present invention and its advantages have been described in detail. However, it should be understood by those skilled in the art that various modifications, combinations, sub-combinations and alterations may occur depending on design and other factors insofar as they are within the scope of the appended claims or the equivalents thereof. Moreover, the terms "include", "including," "include" or any other variations thereof, are intended to cover a non-exclusive inclusion so that a process, method, article, or device that includes a list of elements does not only include these elements but also may include other elements not explicitly listed or inherent to such process, method, article, or device. An element preceded by "a" or "an" does not, if without more constraints, preclude the existence of additional identical elements in the process, method, article, or device that includes the element.

We claim:

1. A computer implemented layout method in a display area of a computer system for disconnected dynamic network, in which the disconnected dynamic network includes multiple graph components, the method comprising,
    selecting a test threshold member of the multiple graph components;
    dividing the multiple graph components into a first subset $S_1$ and a second subset $S_2$ according to the order of their importance values, wherein each of the graph components in the first subset $S_1$ has an importance value greater than or equal to the importance value of the test threshold member, and wherein each of the graph components of the second subset $S_2$ has an importance value less than or equal to the importance value of the test threshold member;
    dividing the first subset $S_1$ into a lower subset $C_m$ and an upper subset $C_p$, wherein the upper subset $C_p$ includes only the graph component having the highest importance value;
    dividing the display area into display portions $S_1'$ and $S_2'$ proportionally according to the importance values of the first subset $S_1$ and the second subset $S_2$;
    dividing the display portion $S_1'$ into display portions $C_p'$ and $C_m'$ proportionally according to the importance values of the upper subset $C_p$ and the lower subset $C_m$;
    iteratively executing selecting the test threshold member, dividing the display area into display portions, and dividing the display portion $S_1'$, until the aspect ratio of display portion $C_p'$ is approximately 1;
    selecting, as a final threshold member, the importance value of the test threshold member that resulted in the aspect ratio of the display portion $C_p$ being approximately 1; and
    selecting for the display area a layout resulting from the dividing the display area into display portions and the dividing the display portion $S_1'$, wherein the divisions are performed with the importance value of the final threshold member.

2. The method of claim 1, further comprising,
    dividing the subset $S_2$ into a left subset $C_l$ and a right subset $C_r$, in which the total importance value of the left subset $C_l$ is approximately that of the right subset $C_r$ and
    dividing the display portion other than $C_p'$ and $C_m'$ into display portions $C_l'$ and $C_r'$ proportionally according to the importance values of the left subset $C_l$ and the right subset $C_r$.

3. The method of claim 2, wherein the display portion $C_p'$ is in the center of the display area.

4. The method of claim 2, wherein the display portion $C_m'$ is beneath the display portion $C_p'$.

5. The method of claim 2, wherein the display portions $C_l'$ and $C_r'$ are on the two opposite sides of the display portion $C_p'$.

6. The method of claim 5, wherein:
    if the width is greater than the height of one or more display portions $C_m'$, $C_l'$ and $C_r'$, the first division, the second division and the third division are performed iteratively for the lower subset $C_m$, the left subset $C_l$ or the right subset $C_r$, respectively, until there is only one graph component left in each subset; and
    if the width is less than the height of one or more of the display portions $C_m'$, $C_l'$ or $C_r'$, the respective display portions $C_m'$, $C_l'$ or $C_r'$ is 90 degrees and then the first division, the second division and the third division are iteratively performed for the lower subset $C_m$, the left subset $C_l$ or the right subset $C_r$, respectively, until there is only one graph component left in each subset.

7. The method of claim 6, wherein triple tree structure is used to save the information of the division of the display area.

8. A layout system for displaying multiple graph components in a display area in a disconnected dynamic network, the system comprising:
    a first division means for selecting a test threshold member of the multiple graph components, and for performing a first division to divide the multiple graph components into a first subset $S_1$ and a second subset $S_2$ according to the order of their importance values, wherein each of the graph components in the first subset $S_1$ has an importance value greater than or equal to the importance value of the test threshold member, and wherein each of the graph components of the second subset $S_2$ has an importance value less than or equal to the importance value of the test threshold member;
    a second division means for performing a second division to divide the first subset $S_1$ into an upper subset $C_p$, which includes only the most important graph component,. and a lower subset $C_m$ which includes the other graph components;
    a first display area division means for dividing the display area into display portions $S_1'$ and $S_2'$ proportionally according to the importance values of the first subset $S_1$ and the second subset $S_2$;

a second display area division means for dividing the display portion $S_1'$ into display portions $C_p'$ and $C_m'$ proportionally according to the importance values of the upper subset $C_p$ and the lower subset $C_m$; and an executing means for:
  causing execution by (i) the first division means, (ii) the second division means and (iii) the corresponding display division means iteratively until the aspect ratio of display portion $C_p'$ is approximately 1;
  selecting, as a final threshold member, the importance value of the test threshold member that resulted in the aspect ratio of the display portion $C_p$ being approximately 1; and
  selecting for the display area a layout resulting from the dividing the display area into display portions and the dividing the display portion $S_1'$, wherein the divisions are performed with the importance value of the final threshold member.

9. The system of claim 8, further comprising,
a third division means for dividing the subset $S_2$ into a left subset $C_l$ and a right subset $C_r$, in which the total importance value of the left subset $C_l$ and of the right subset $C_r$ are approximately equal; and
a third display area division means for dividing the display portion $S_2'$ into display portions $C_l'$ and $C_r'$ proportionally according to the importance values of the left subset $C_l$ and the right subset $C_r$.

10. The system of claim 9, wherein the display portion $C_p'$ is in the center of the display area.

11. The system of claim 9, wherein the display portion $C_m'$ is beneath the display portion $C_p'$.

12. The system of claim 9, wherein the display portions $C_l'$ and $C_r'$ are on the two opposite sides of the display portion $C_p'$.

13. The system of claim 12, wherein the system is configured so that:
  if the width is greater than the height for any of the display portions $C_m'$, $C_l'$ and $C_r'$, the first division, the second division and the division of the display area are iteratively performed for the respective subsets, until there is only one graph component left in each subset; and
  If the width is less than the height for any of the display portions $C_m'$, $C_l'$ and $C_r'$, such display portions are rotated 90 degrees and then the first division, the second division and the division of the display area are iteratively performed for the respective subsets until there is only one graph component left in each subset.

14. The system of claim 13, wherein triple tree structure is used to save the information of the division of the display area.

* * * * *